United States Patent
Kim et al.

(10) Patent No.: US 10,564,971 B2
(45) Date of Patent: Feb. 18, 2020

(54) METHOD AND APPARATUS FOR PROCESSING MACRO INSTRUCTION USING ONE OR MORE SHARED OPERATORS

(71) Applicant: Samsung Electronics Co., Ltd., Suwon-si, Gyeonggi-do (KR)

(72) Inventors: Doo-hyun Kim, Seoul (KR); Jae-hyun Kim, Seoul (KR); Joon-ho Song, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 15/535,304

(22) PCT Filed: Oct. 15, 2015

(86) PCT No.: PCT/KR2015/010910
§ 371 (c)(1),
(2) Date: Jun. 12, 2017

(87) PCT Pub. No.: WO2016/093484
PCT Pub. Date: Jun. 16, 2016

(65) Prior Publication Data
US 2017/0329604 A1 Nov. 16, 2017

(30) Foreign Application Priority Data
Dec. 10, 2014 (KR) ........................ 10-2014-0177829

(51) Int. Cl.
*G06F 9/30* (2018.01)
*G06F 9/38* (2018.01)
*G06F 9/06* (2006.01)

(52) U.S. Cl.
CPC .......... *G06F 9/3009* (2013.01); *G06F 9/3001* (2013.01); *G06F 9/3017* (2013.01); *G06F 9/3818* (2013.01); *G06F 9/3895* (2013.01)

(58) Field of Classification Search
CPC .... G06F 9/3891; G06F 9/3895; G06F 9/3009; G06F 9/06; G06F 9/3017; G06F 9/38;
(Continued)

(56) References Cited

U.S. PATENT DOCUMENTS

| 5,410,658 A | 4/1995 | Sawase et al. |
| 5,742,782 A * | 4/1998 | Ito .......................... G06F 9/3822 712/210 |

(Continued)

FOREIGN PATENT DOCUMENTS

| JP | 05-204632 A | 8/1993 |
| JP | 2004-246609 A | 9/2004 |

(Continued)

*Primary Examiner* — Aimee Li
*Assistant Examiner* — Shawn Doman
(74) *Attorney, Agent, or Firm* — Jefferson IP Law, LLP

(57) ABSTRACT

A processor includes: at least one operator; and at least one macro instruction processing unit configured to share the at least one operator, wherein the at least one macro instruction processing unit is configured to execute a macro instruction with respect to input data by using the at least one operator to output result data, and to control the at least one operator to perform an operation included in the macro instruction, and the at least one macro instruction processing unit comprises: a scheduler configured to manage schedules of the at least one operator and output input data and a control signal to the at least one operator; and a controller configured to control the scheduler to execute the macro instruction and to receive the result data from the scheduler.

14 Claims, 13 Drawing Sheets

(58) Field of Classification Search
CPC . G06F 9/3818; G06F 15/7817; G06F 15/7892
USPC ........................................................ 712/208
See application file for complete search history.

(56) References Cited

U.S. PATENT DOCUMENTS

| | | | |
|---|---|---|---|
| 6,859,919 | B1 | 2/2005 | Deffler et al. |
| 6,925,553 | B2 | 8/2005 | Roussel et al. |
| 7,664,810 | B2* | 2/2010 | Crispin .................. G06F 7/728 708/491 |
| 8,145,209 | B2 | 3/2012 | Hwang et al. |
| 2003/0177288 | A1 | 9/2003 | Kunimatsu et al. |
| 2007/0106720 | A1* | 5/2007 | Pisek ..................... G06F 7/5443 708/523 |
| 2008/0140990 | A1* | 6/2008 | Yasukawa ................ G06F 1/32 712/34 |
| 2009/0003593 | A1* | 1/2009 | Gopal .................. G06F 7/5324 380/30 |
| 2010/0095096 | A1 | 4/2010 | Yoshioka |
| 2010/0161849 | A1* | 6/2010 | Suk ...................... G06F 13/122 710/23 |

FOREIGN PATENT DOCUMENTS

| | | |
|---|---|---|
| JP | 2006-293673 A | 10/2006 |
| KR | 1993-0008604 A | 5/1993 |
| KR | 2001-0106514 A | 11/2001 |
| KR | 2003-0074047 A | 9/2003 |
| KR | 10-2008-0083491 A | 9/2008 |
| WO | 2009/001568 A1 | 12/2008 |

* cited by examiner

METHOD AND APPARATUS FOR PROCESSING MACRO INSTRUCTION USING ONE OR MORE SHARED OPERATORS

TECHNICAL FIELD

One or more embodiments relate to a method and apparatus for processing a macro instruction.

BACKGROUND ART

A processor includes an instruction system and executes a program via a combination of instructions. An instruction includes basic operations, such as an addition, a subtraction, a multiplication, and a division, and a combination of basic operations. A macro instruction represents a set of instructions and is defined as an instruction to perform a more complicated operation than the basic operations. Digital signal processing (DSP) specialized for audio or video processing may include a macro instruction specific to audio or video processing.

DETAILED DESCRIPTION OF THE INVENTION

Technical Problem

One or more embodiments provide a method and apparatus for processing a macro instruction.

Technical Solution

According to one or more embodiments, a processor includes: at least one operator; and at least one macro instruction processing unit configured to share the at least one operator, wherein the at least one macro instruction processing unit is configured to execute a macro instruction with respect to input data by using the at least one operator to output result data.

According to one or more embodiments, a method of processing a macro instruction includes: allocating a macro instruction to one of a plurality of macro instruction processing units; processing a macro instruction by using operators shared by the macro instruction processing units; and outputting result data.

Advantageous Effects

A processor 1000 according to an embodiment may process a macro instruction by using operators 800.

Macro instruction processing units 500 according to an embodiment may share and use the operators 800 included in the processor 1000.

BEST MODE

According to one or more embodiments, a processor includes: at least one operator; and at least one macro instruction processing unit configured to share the at least one operator, wherein the at least one macro instruction processing unit is configured to execute a macro instruction with respect to input data by using the at least one operator to output result data, and to control the at least one operator to perform an operation included in the macro instruction, and the at least one macro instruction processing unit comprises: a scheduler configured to manage schedules of the at least one operator and output input data and a control signal to the at least one operator; and a controller configured to control the scheduler to execute the macro instruction and to receive the result data from the scheduler.

MODE OF THE INVENTION

Figure 1:
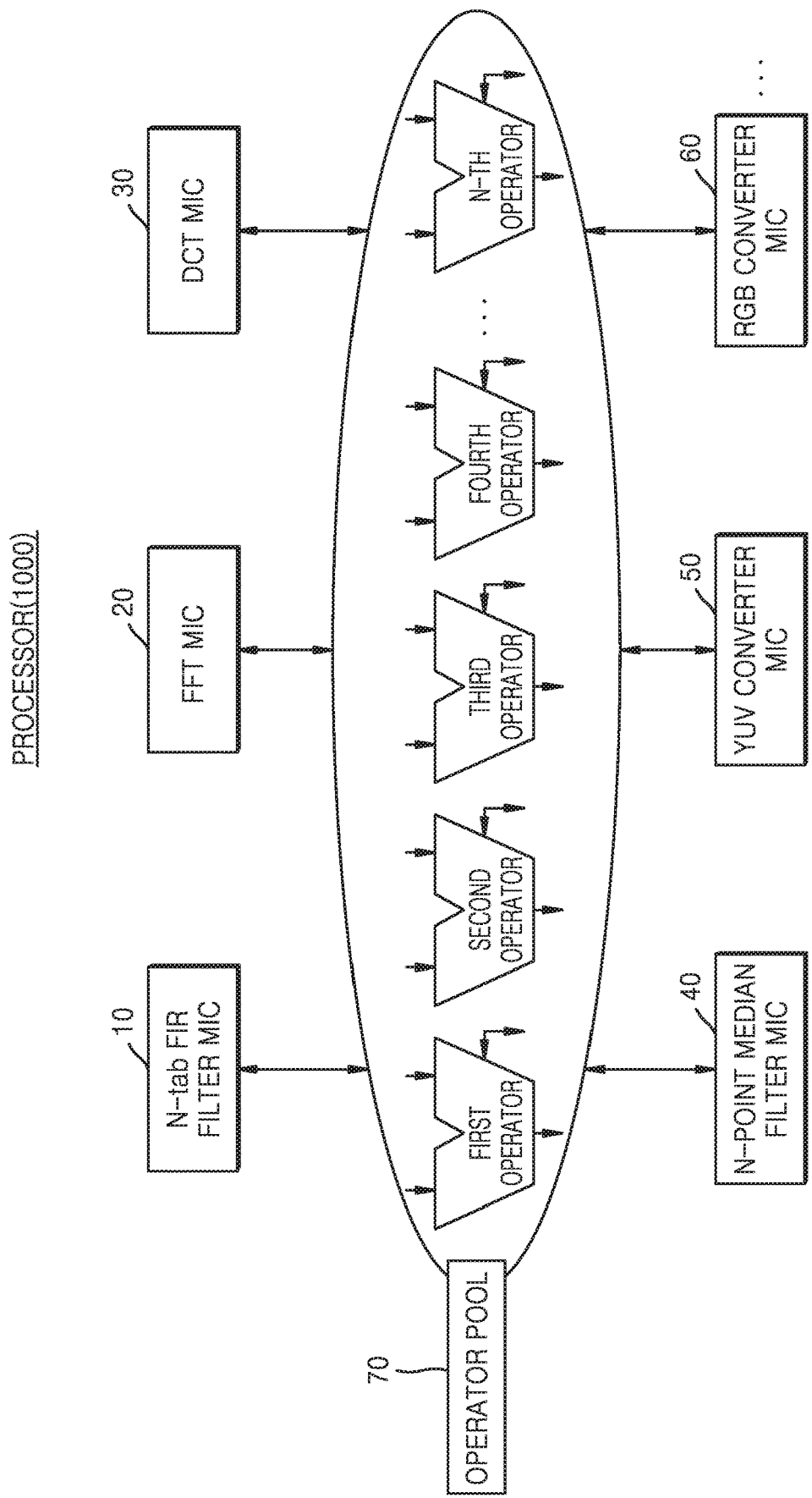
FIG. 1 is a block diagram for describing a processor according to an embodiment.

FIG. 1 is a block diagram for describing a processor according to an embodiment. Referring to FIG. 1, a processor 1000 may include a plurality of macro instruction processing units 10 through 60 that share first through N-th operators. An N-tab FIR FILTER MIC 10, an FFT MIC 20, a DCT MIC 30, an N-point Median Filter MIC 40, a YUV Converter MIC 50, and an RGB Converter MIC 60 are examples of the macro instruction processing units. An operator pool 70 includes a plurality of operators.

The processor 1000 may process a macro instruction by using the first through N-th operators. The processor 1000 may use the first through N-th operators in order to execute the macro instruction. In other words, the macro instruction processing units 10 through 60 execute the macro instruction by using the first through N-th operators. The macro instruction processing units 10 through 60 process the macro instruction by controlling the first through N-th operators included in the processor 1000. Accordingly, the macro instruction processing units 10 through 60 do not need to individually include operators, and thus, the size of the processor 1000 may be reduced.

Figure 2:
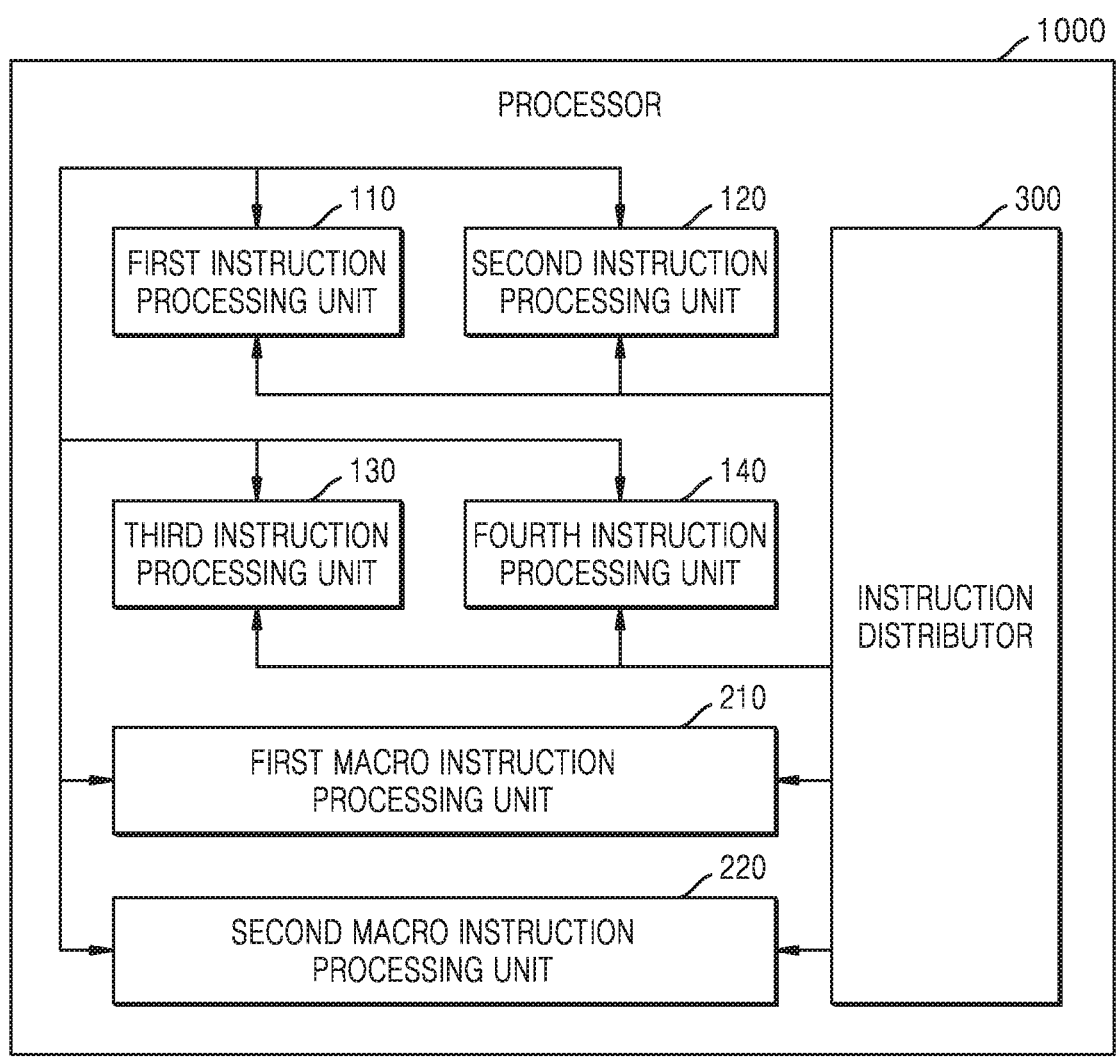
FIG. 2 is a block diagram of a structure of a processor according to an embodiment.

FIG. 2 is a block diagram of a structure of a processor according to an embodiment. Referring to FIG. 2, the processor 1000 may include first and second macro instruction processing units 210 and 220 that share first through fourth instruction processing units 110 through 140. The first through fourth instruction processing units 110 through 140 process a general instruction, and the first and second macro instruction processing units 210 through 220 process a macro instruction by using the first through fourth instruction processing units 110 through 140. The first through fourth instruction processing units 110 through 140 may directly process an instruction or may be controlled by the first and second macro instruction processing units 210 and 220.

In FIG. 2, the four instruction processing units 110 through 140 are shared by the two macro instruction processing units 210 and 220. However, a number of instruction processing units and a number of macro instruction processing units are not limited thereto. The processor 1000 may include two or more macro instruction processing units, and the macro instruction processing units may share 4 or more instruction processing units.

An instruction distributor 300 distributes an instruction received from an instruction decoder. When the instruction distributor 300 receives a general instruction or a single instruction, the instruction distributor 300 allocates the received instruction to one of the first through fourth instruction processing units 110 through 140. When the instruction distributor 300 receives a macro instruction, the instruction distributor 300 allocates the received macro instruction to one of the first and second macro instruction processing units 210 and 220.

Instructions that may be processed by the first through fourth instruction processing units 110 through 140 may be restricted, and the instruction distributor 300 distributes an instruction in consideration of instructions processable by the instruction processing units 110 through 140.

Macro instructions that may be processed by the first and second macro instruction processing units 210 and 220 may also be restricted, and the instruction distributor 300 distributes a macro instruction in consideration of macro instructions processable by the first and second macro instruction processing units 210 and 220. The first and second macro instruction processing units 210 and 220 may be designed to process only specific macro instructions.

The first and second macro instruction processing units 210 and 220 use the first through fourth instruction processing units 110 through 140 when executing the received macro instruction. The first and second macro instruction processing units 210 and 220 control the first through fourth instruction processing units 110 through 140 in order to execute basic instructions included in the macro instruction. In other words, the first and second macro instruction processing units 210 and 220 may process the macro instruction by repeating a process of distributing the basic instructions to the first through fourth instruction processing units 110 through 140 and receiving processing results from the first through fourth instruction processing units 110 through 140.

Figure 3:
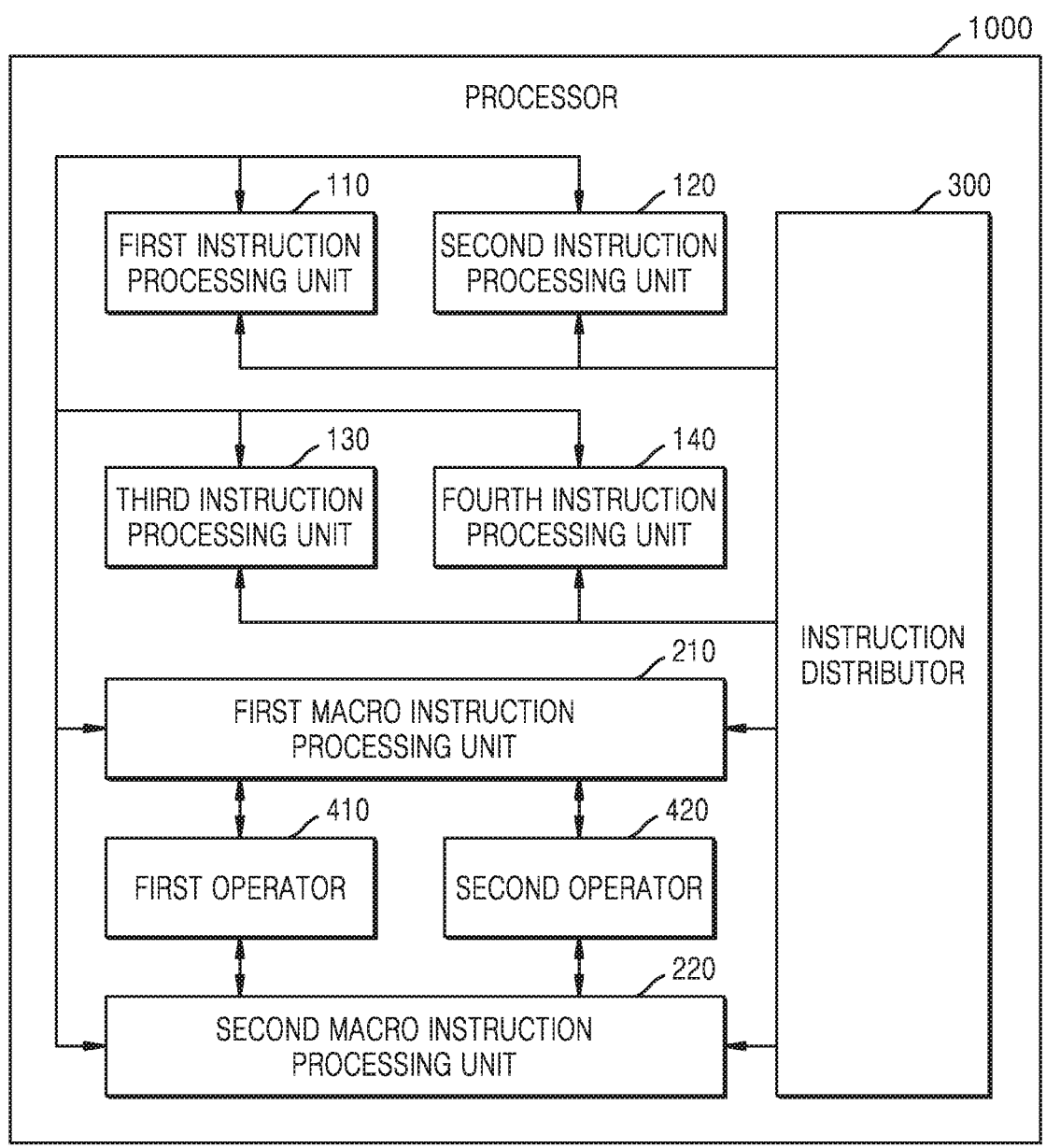
FIG. 3 is a block diagram of a structure of a processor according to an embodiment.

FIG. 3 is a block diagram of a structure of a processor according to an embodiment. Referring to FIG. 3, the first and second macro instruction processing units 210 and 220 may process a macro instruction by using the first through fourth instruction processing units 110 through 140 and first and second operators 410 and 420. Alternatively, the first and second macro instruction processing units 210 and 220 may process the macro instruction by using only the first through fourth instruction processing units 110 through 140 or by using only the first and second operators 410 and 420.

The first and second macro instruction processing units 210 and 220 may be implemented to process specific macro instructions. For example, when the first macro instruction processing unit 210 is a unit for processing a Fast Fourier transform (FFT) and the second macro instruction processing unit 220 is a unit for processing a discrete cosine transform (DCT), the instruction distributor 300 may allocate an FFT macro instruction to the first macro instruction processing unit 210 and a DCT macro instruction to the second macro instruction processing unit 220.

Figure 4:
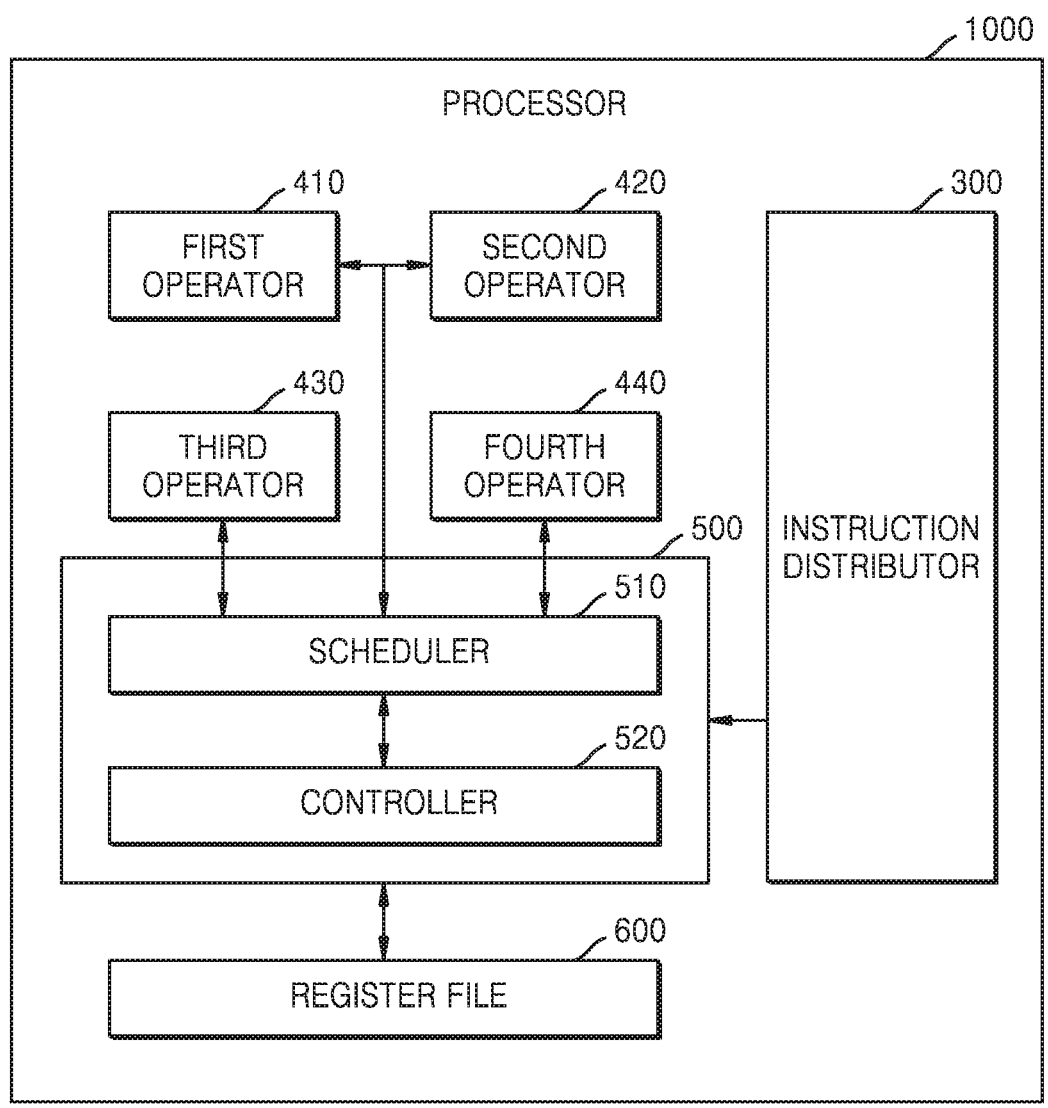
FIG. 4 is a block diagram of a structure of a processor according to an embodiment.

FIG. 4 is a block diagram of a structure of a processor according to an embodiment. Referring to FIG. 4, a macro instruction processing unit 500 includes a scheduler 510 and a controller 520. The processor 1000 further includes a register file 600.

The macro instruction processing unit 500 processes a macro instruction by using first through fourth operators 410 through 440. In other words, the macro instruction processing unit 500 processes the macro instruction by using unit operators 410 through 440 included in the processor 1000.

The macro instruction processing unit 500 may store data in the register file 600 or read data from the register file 600. The macro instruction processing unit 500 may store data or operation results which are generated when processing the macro instruction by using the first through fourth operators 410 through 440 in the register file 600 and may also store result data obtained by processing the macro instruction in the register file 600.

The scheduler 510 manages the schedules of the first through fourth operators 410 through 440. The scheduler 510 outputs input data or a control signal to the first through fourth operators 410 through 440 and receives operation results from the first through fourth operators 410 through 440. The scheduler 510 may output the operation results to the controller 520 or may output the operation results back to the first through fourth operators 410 through 440.

The controller 520 performs all of the operations included in the macro instruction and then outputs result values. To process the macro instruction, the controller 520 may output the input data or the control signal to the scheduler 510. The controller 520 controls the scheduler 510 according to an order in which the operations for processing the macro instruction are processed.

The register file 600 stores result data obtained by processing the macro instruction. The register file 600 receives the result data from the controller 520. The register file 600 may also store intermediate data that is generated while the macro instruction is being processed. The register file 600 may further store data that is output from the macro instruction processing unit 500.

Figure 5:
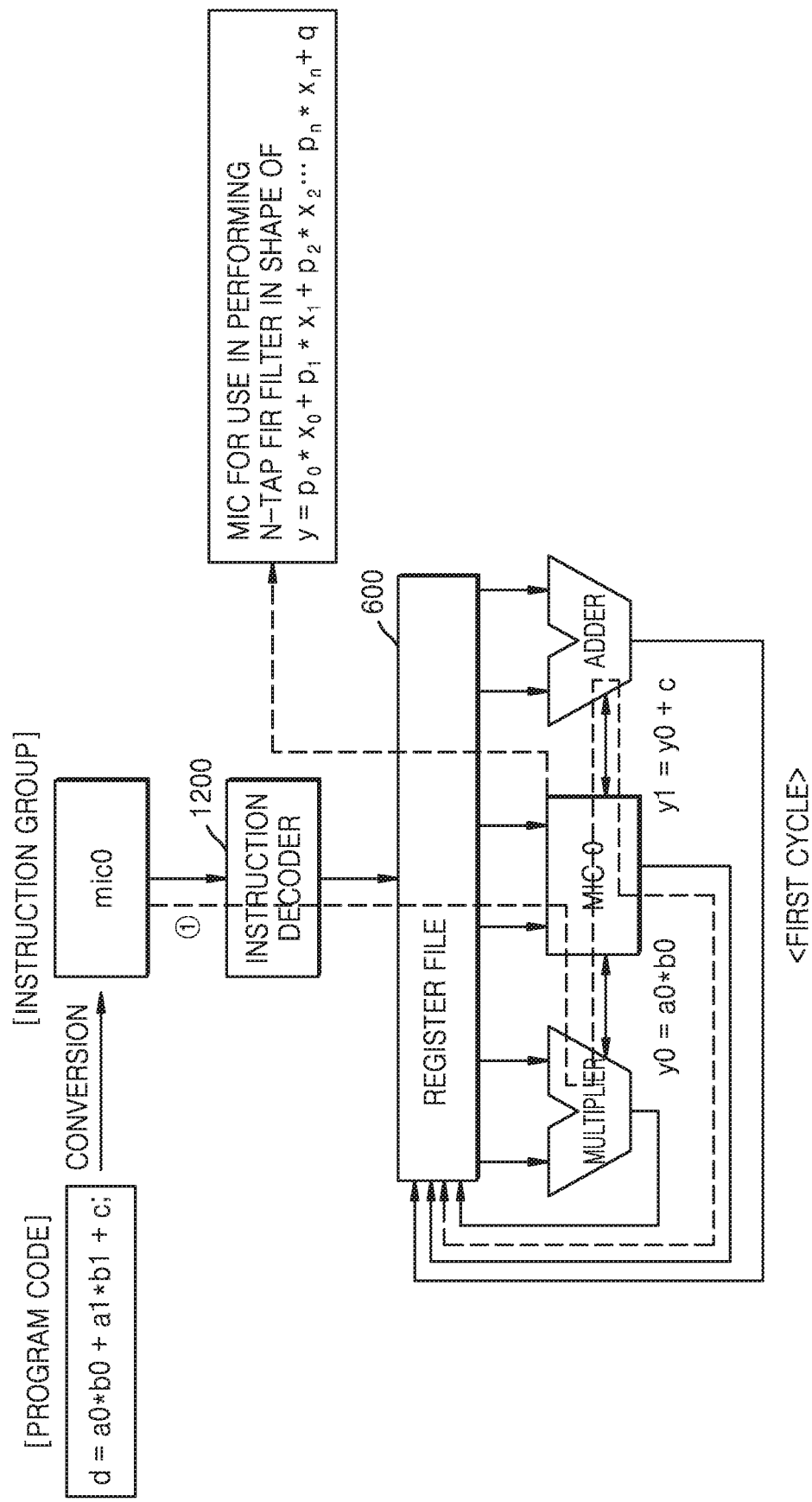
FIGS. 5 and 6 are diagrams for describing operations of a macro instruction processing unit according to an embodiment.
Figure 6:
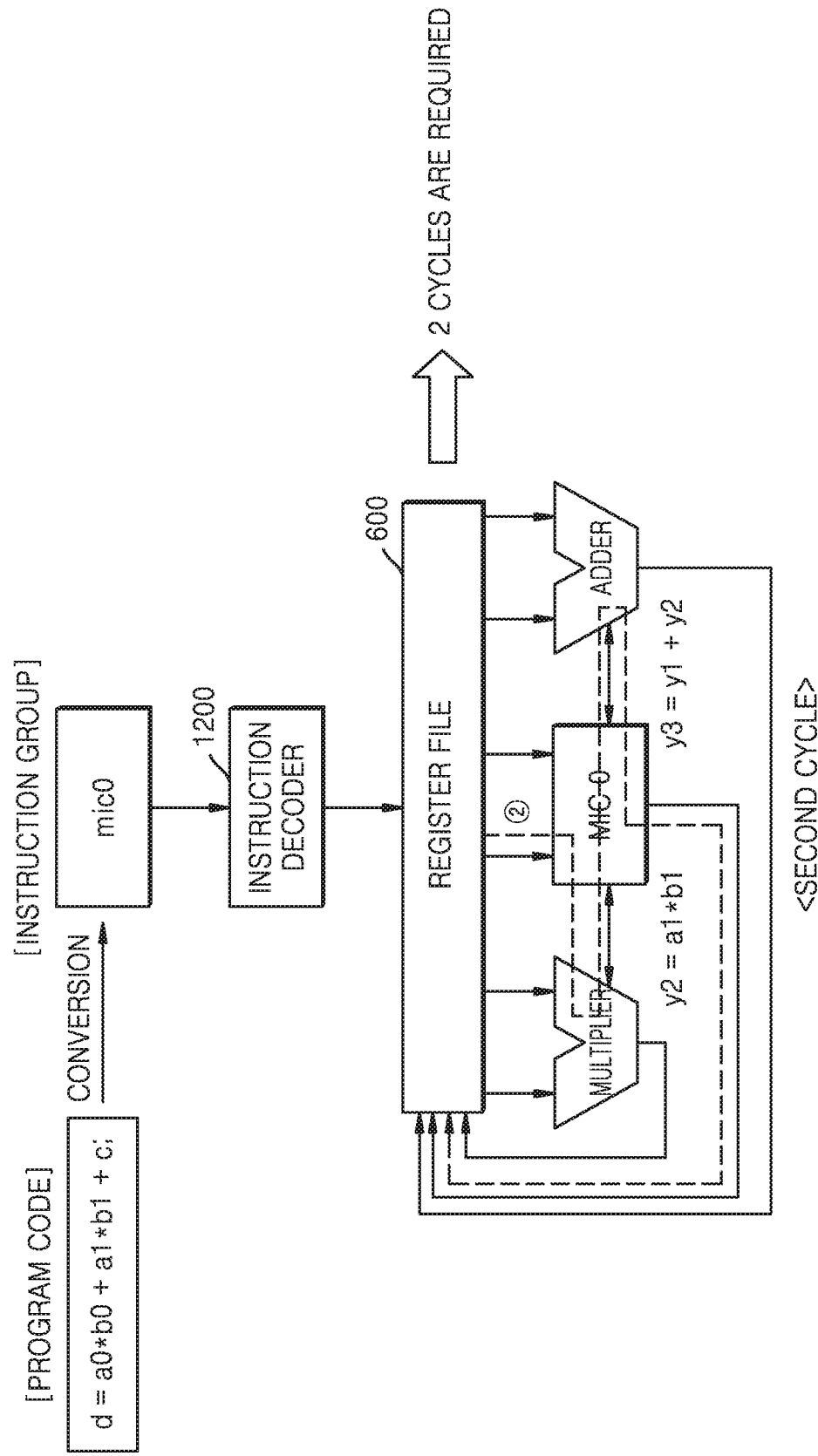

FIGS. 5 and 6 are diagrams for describing operations of a macro instruction processing unit according to an embodiment. A program code represents an operation to be processed by the processor 1000, and an instruction group represents instructions included in the program code. FIGS. 5 and 6 illustrate a case where the instruction group includes only a mic0 instruction. FIG. 5 illustrates an operation of the processor 1000 during a first cycle, and FIG. 6 illustrates an operation of the processor 1000 during a second cycle. The processor 1000 may process the mic0 instruction during the first and second cycles.

An instruction decoder 1200 decodes an instruction that is to be processed within the instruction group. The instruction decoder 1200 may interpret the instruction and check an operation that is to be performed.

An MIC 0 unit processes the mic0 instruction. For example, the MIC 0 unit is a macro instruction processing unit for use in performing an n-tap FIR filter. The MIC 0 unit may process an operation $y=p0*x0+p1*x1+p2*x2 \ldots pn*xn+q$.

The MIC 0 unit calculates $y0=a0*b0$ by using a multiplier and calculates $y1=y0+c$ by using an adder. The MIC 0 unit stores the calculated y1 in the register file 600.

In FIG. 6, the MIC 0 unit calculates $y2=a1*b1$ by using the multiplier and calculates $y3=y1+y2$ by using the adder.

The MIC 0 unit stores the calculated y3 in the register file 600 and terminates processing of the mic0 instruction.

The MIC 0 unit may process the mic0 instruction even without including separate operators by using an adder and a multiplier included in the processor 1000. The MIC 0 unit may process the mic0 instruction during two cycles.

Figure 7:
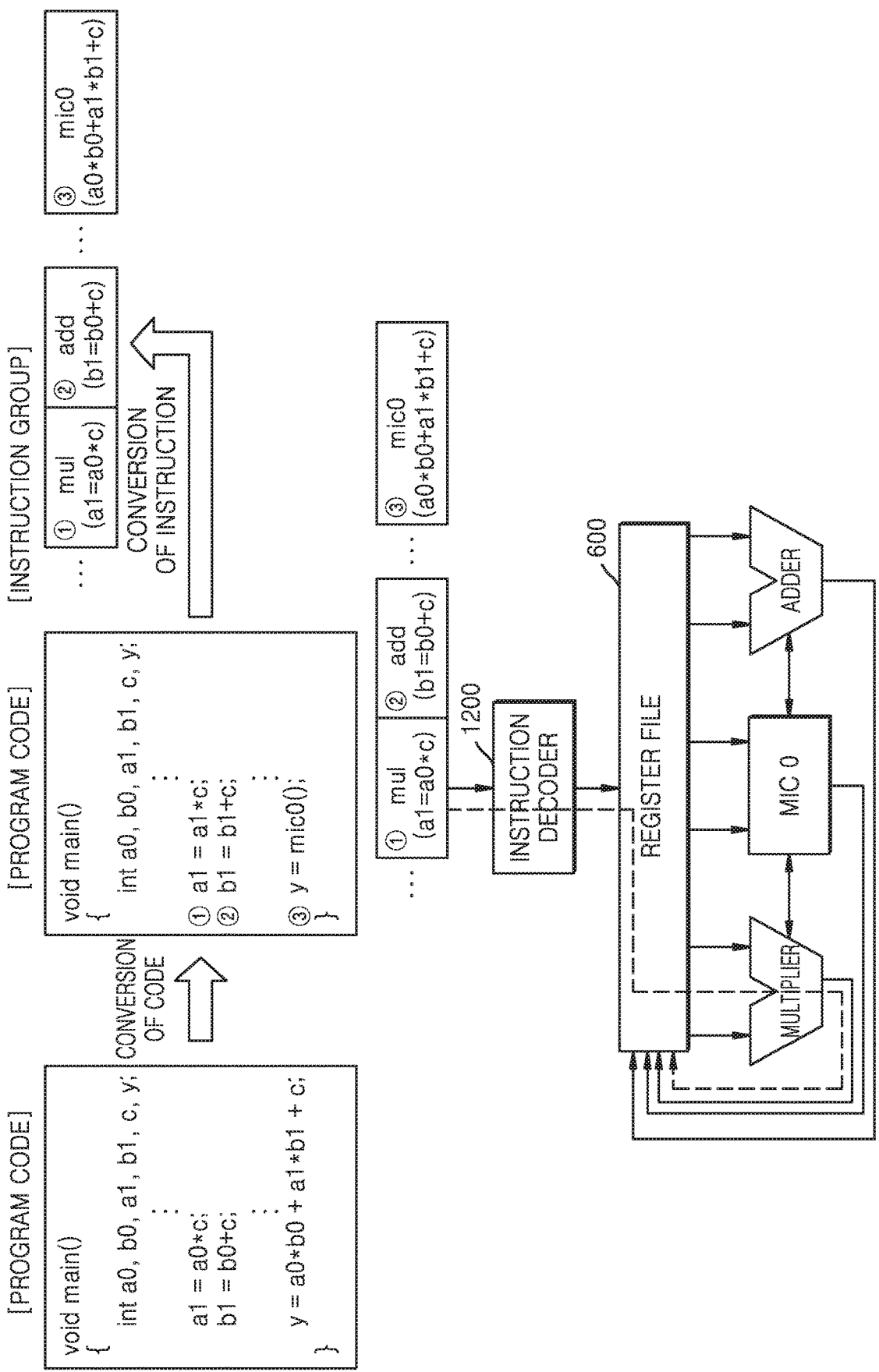
FIGS. 7-9 are diagrams for describing operations of a macro instruction processing unit according to an embodiment.
Figure 8:
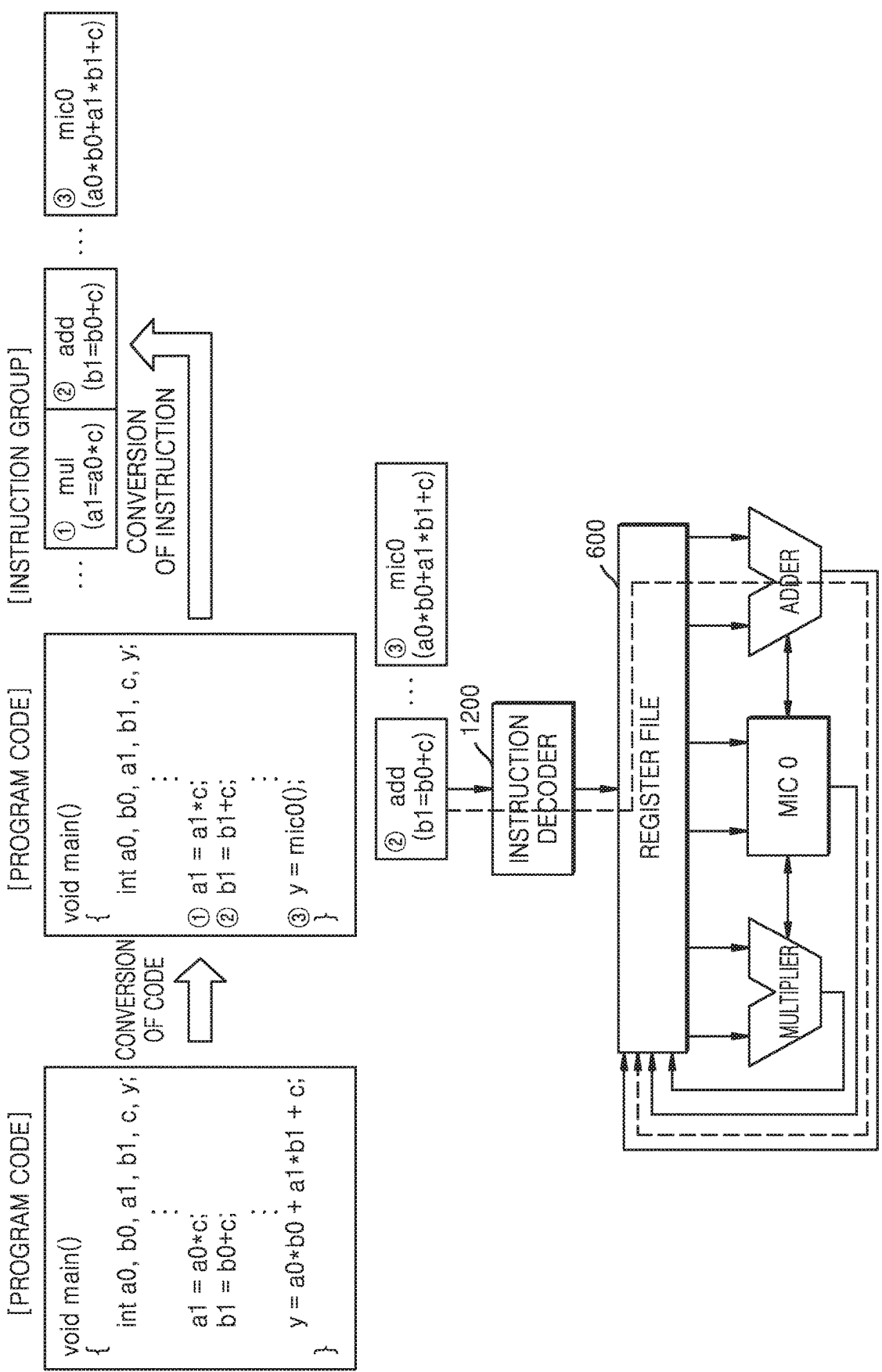
Figure 9:
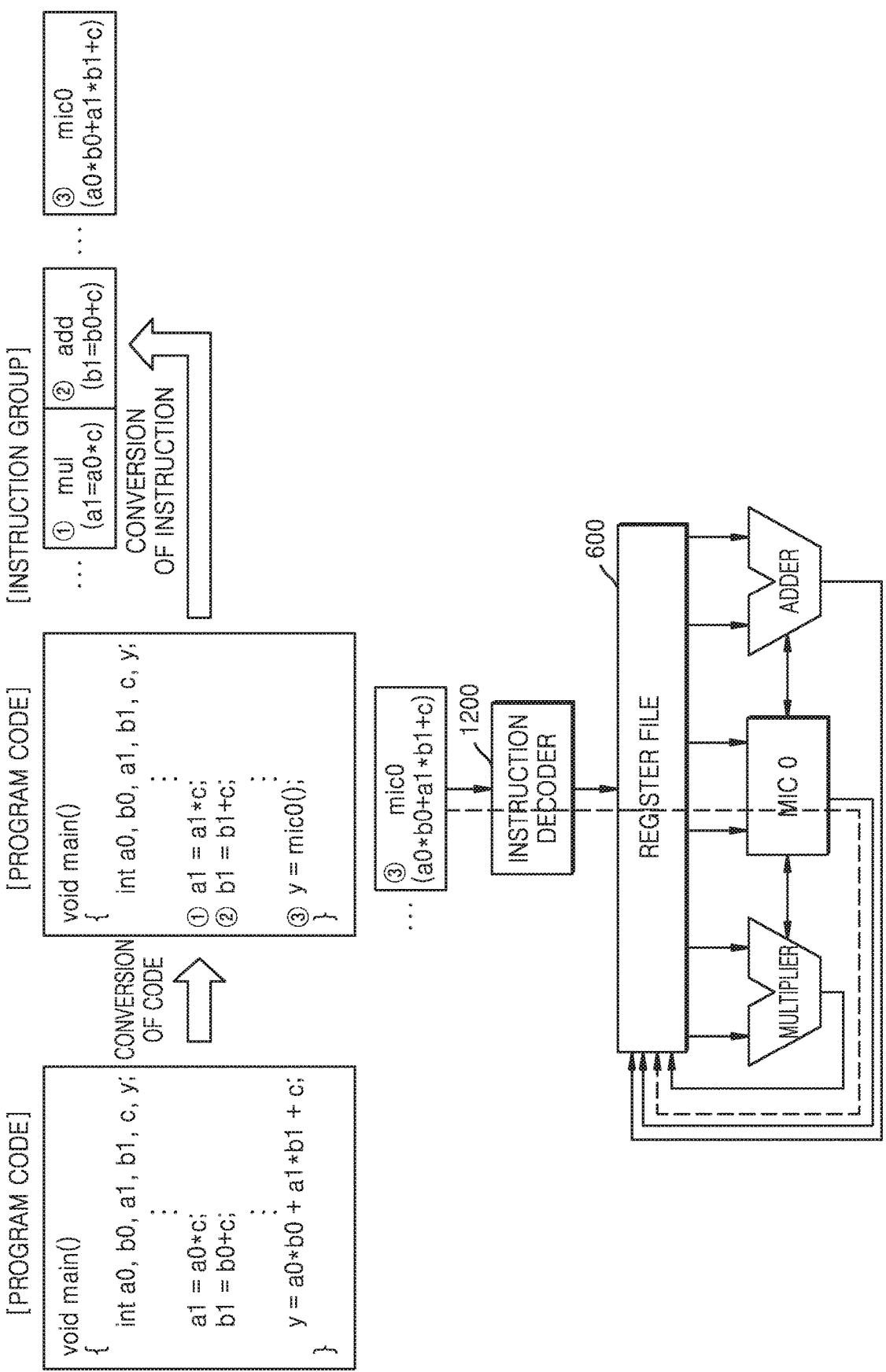

FIGS. 7-9 are diagrams for describing operations of a macro instruction processing unit according to an embodiment. A program code may include at least one instruction, and FIG. 7 illustrates a case where the program code includes three operations. A first operation is a1=a1*c, a second operation is b1=b1+c, and a third operation is y=a0*b0+a1*b1+c.

The program code may be converted into an instruction group. In FIG. 7, the instruction group includes three instructions. A first instruction is a mu1 instruction, a second instruction includes an add instruction, and a third instruction is a mic0 instruction.

FIG. 7 illustrates a process in which the processor 1000 processes the mu1 instruction. The mu1 instruction is interpreted by the instruction decoder 1200. The processor 1000 processes the mu1 instruction by using the multiplier.

FIG. 8 illustrates a process in which the processor 1000 processes the add instruction. The processor 1000 processes the add instruction by using the adder.

FIG. 9 illustrates a process in which the processor 1000 processes the mic0 instruction. The processor 1000 allocates the mic0 instruction to the MIC 0 unit. The MIC 0 unit processes the mic0 instruction by using input data a0, b0, a1, b1, and c and the multiplier and the adder. The MIC 0 unit stores result data obtained by processing the mic0 instruction, in the register file 600.

As shown in FIGS. 7-9, the processor 1000 may process an instruction included in the instruction group, according to a form of the instruction. In other words, the processor 1000 may process the instruction by using an operator included in the processor 1000, such as a multiplier or an adder, or may allocate the instruction to the macro instruction processing unit 500, such as the MIC 0 unit. The MIC 0 unit processes a macro instruction by using the operators included in the processor 1000.

Figure 10:
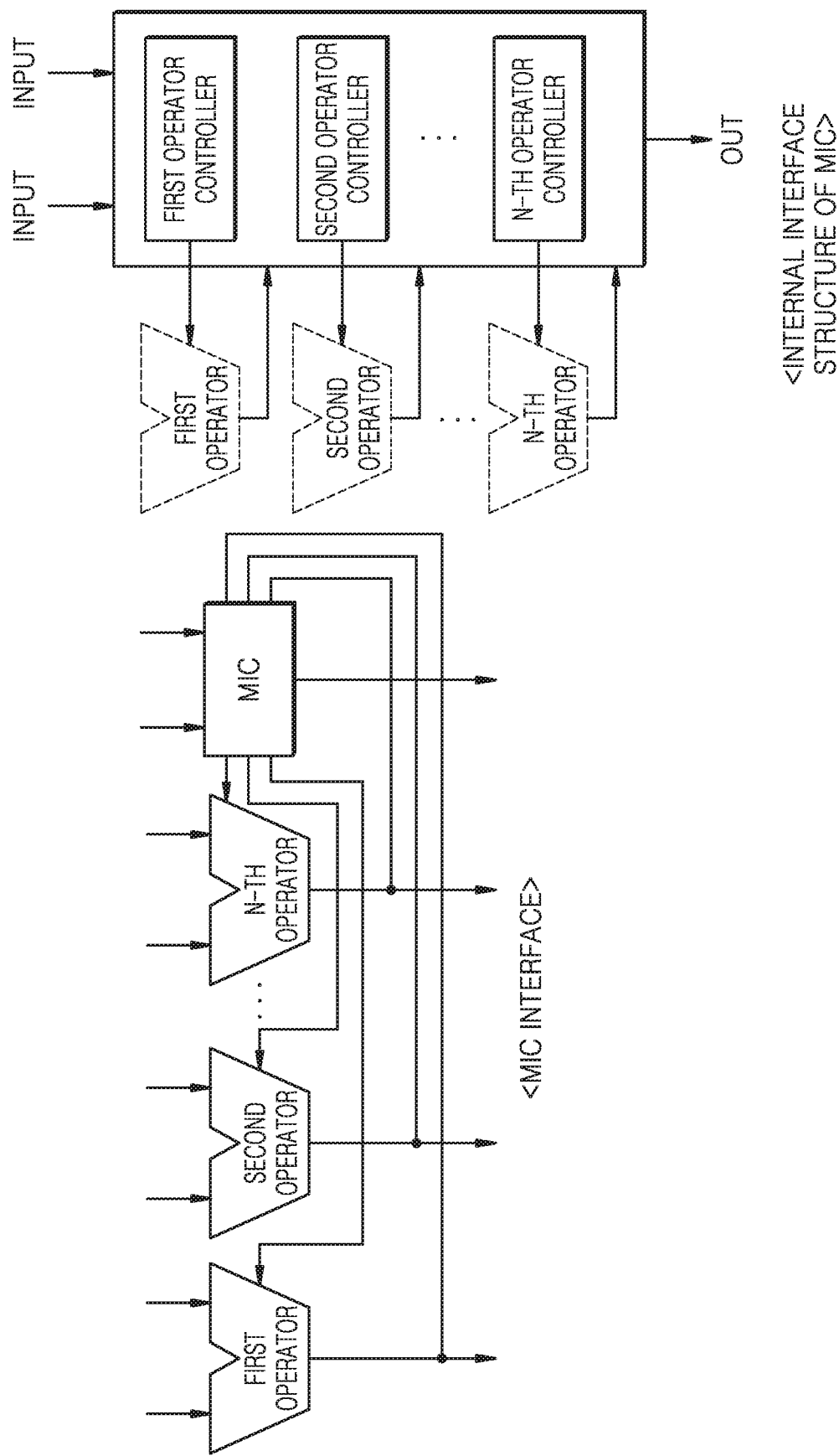
FIG. 10 illustrates a structure of a macro instruction processing unit according to an embodiment.

FIG. 10 illustrates a structure of a macro instruction processing unit according to an embodiment. Referring to FIG. 10, the macro instruction processing unit 500 may include operator controllers that control operators, respectively. The processor 1000 may include first through N-th operators. The macro instruction processing unit 500 may include first through N-th operator controllers corresponding to the first through N-th operators, respectively. Accordingly, the first operator controller controls the first operator, the second operator controller controls the second operator, and the N-th operator controller controls the N-th operator.

The macro instruction processing unit 500 may be connected to the first through N-th operators, and may output input data to the first through N-th operators or receive result data from the first through N-th operators.

Figure 11:
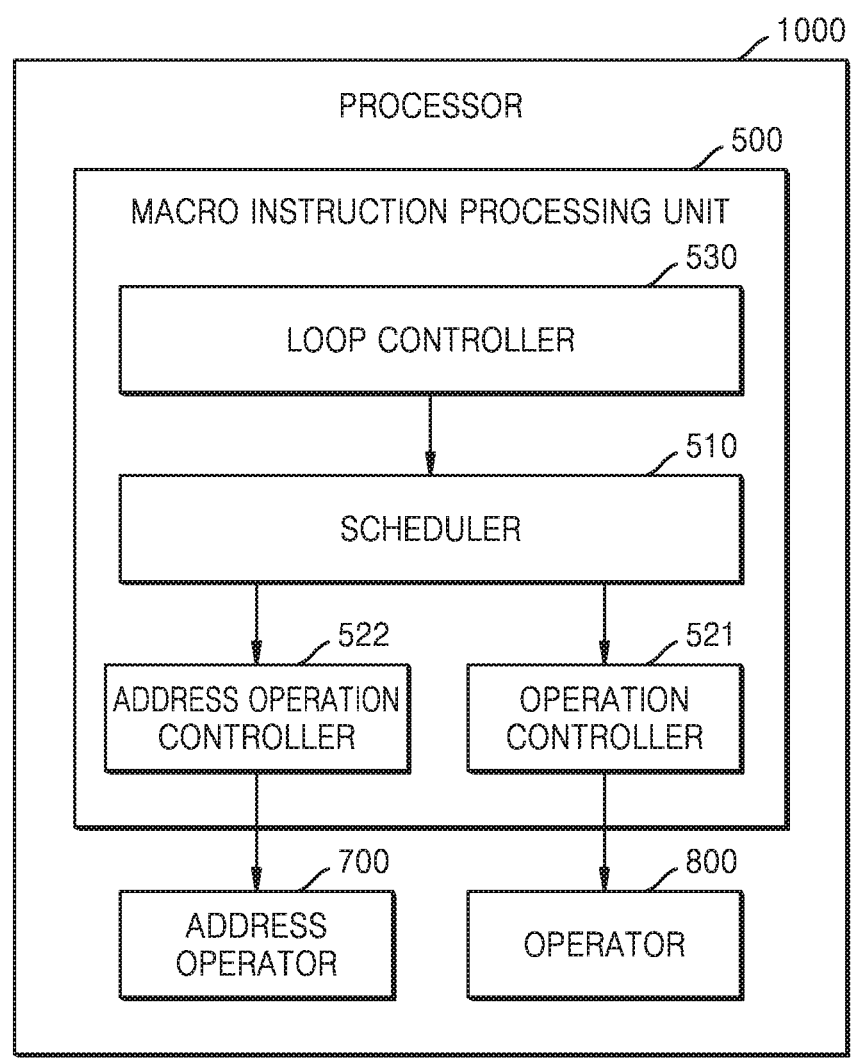
FIG. 11 is a block diagram for describing a processor according to an embodiment.

FIG. 11 is a block diagram for describing a processor according to an embodiment. Referring to FIG. 11, the processor 1000 includes a macro instruction processing unit 500, an address operator 700, and an operator 800. The macro instruction processing unit 500 includes a loop controller 530, a scheduler 510, an address operation controller 522, and an operation controller 521.

The loop controller 530 controls a loop operation included in a macro instruction. The loop operation is a repetition of the same operation. The loop controller 530 controls the scheduler 510 according to the loop operation.

The scheduler 510 controls the address operation controller 522 and the operation controller 521. The address operation controller 522 controls the address operator 700, and the operation controller 521 controls the operator 800. The address operator 700 calculates a storage location of the register file 600 or internal memory.

Even when the macro instruction processing unit 500 includes neither the address operators 700 nor the operators 800, the macro instruction processing unit 500 may process the loop operation by using an address operator 700 and an operator 800 included in the processor 1000.

Figure 12:
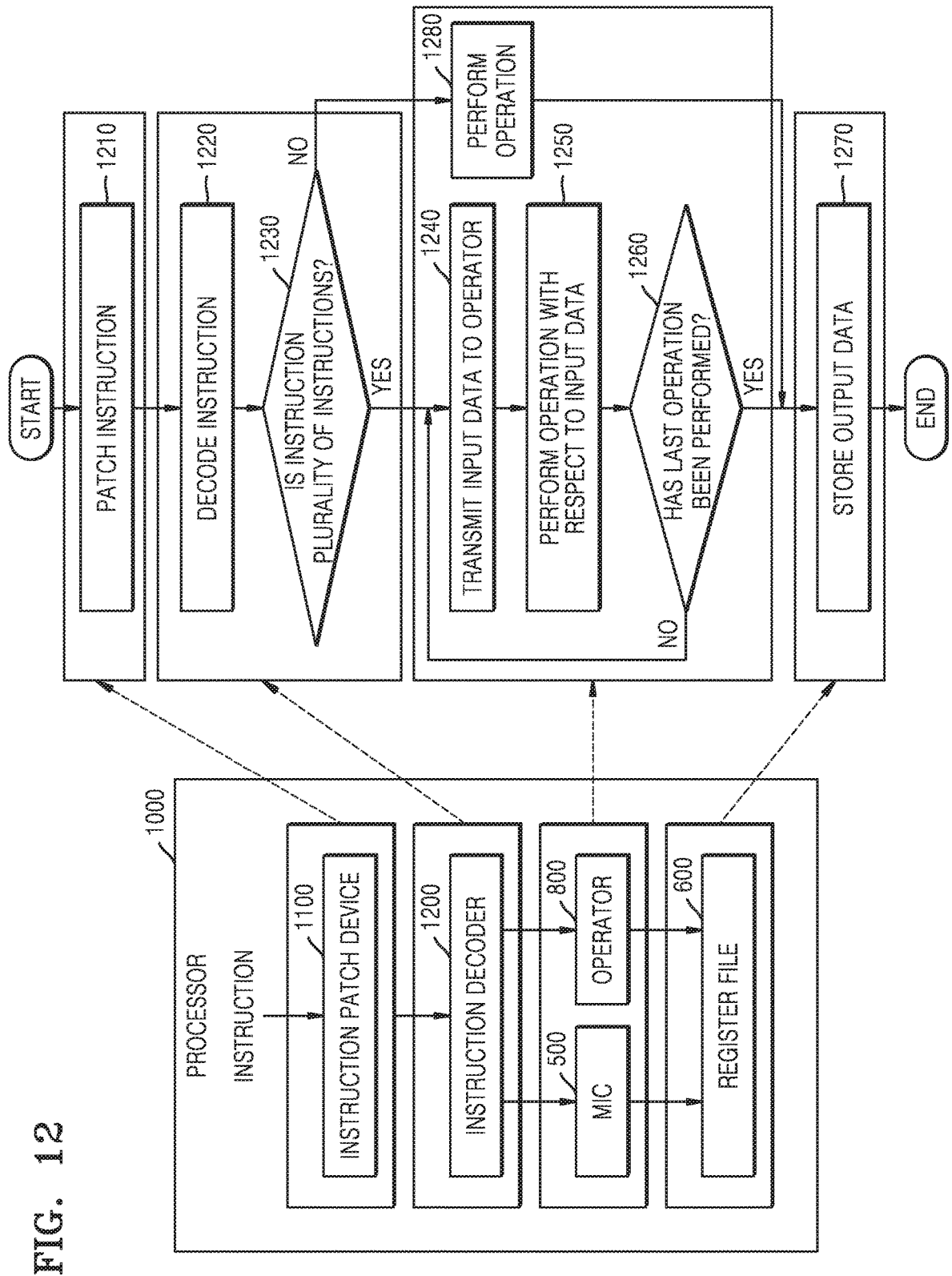
FIG. 12 describes a processor and an operation of the processor, according to an embodiment.

FIG. 12 describes a processor and an operation of the processor, according to an embodiment. Referring to FIG. 12, the processor 1000 includes an instruction patch device 1100, an instruction decoder 1200, a macro instruction processing unit 500, an operator 800, and a register file 600.

In operation 1210, the instruction patch device 1100 patches an instruction. Patching indicates a process of reading an instruction from a program memory.

In operation 1220, the instruction decoder 1200 decodes the instruction. The instruction decoder 1200 interprets the instruction received from the instruction patch device 1100.

In operation 1230, the instruction decoder 1200 determines whether the instruction includes a plurality of instructions. In other words, the instruction decoder 1200 determines whether the instruction is a general instruction or a macro instruction. If the instruction is a general instruction, the method proceeds to operation 1280. If the instruction is a macro instruction, the method proceeds to operation 1240.

In operation 1240, the macro instruction processing unit 500 transmits input data to the operator 800.

In operation 1250, the operator 800 performs an operation with respect to the input data.

In operation 1260, the macro instruction processing unit 500 determines whether the last operation has been performed. In other words, the macro instruction processing unit 500 determines whether all of a plurality of instructions included in the macro instruction have been processed. If the last operation has been performed, the method proceeds to operation 1270. Otherwise, the method proceeds to operation 1240.

In operation 1270, the register file 600 stores output data output by the macro instruction processing unit 500 or the operator 800.

In operation 1280, the operator 800 performs an operation. Because the instruction does not include a plurality of instructions, the instruction is allocated to the operator 800, and the operator 800 performs an operation with respect to the input data and outputs result data to the register file 600.

Figure 13:
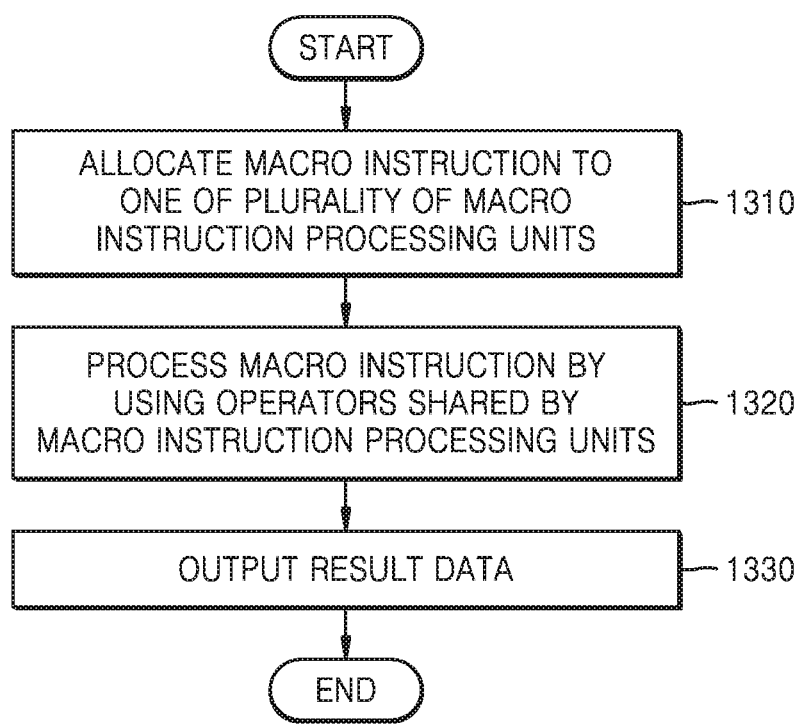
FIG. 13 is a flowchart of a method of processing a macro instruction, according to an embodiment.

FIG. 13 is a flowchart of a method of processing a macro instruction, according to an embodiment.

In operation 1310, the processor 1000 allocates a macro instruction to one of a plurality of macro instruction processing units. The processor 1000 may include a plurality of macro instruction processing units.

In operation 1320, the macro instruction processing units process the macro instruction by using operators shared by the macro instruction processing units. The macro instruction processing units do not individually include operators, but share and use the plurality of operators. Accordingly, the number of operators included in the processor 1000 may be reduced.

In operation 1330, the processor 1000 outputs result data obtained by processing the macro instruction.

The processor 1000 according to an embodiment may process a macro instruction by using operators 800.

Macro instruction processing units 500 according to an embodiment may share and use the operators 800 included in the processor 1000.

Apparatuses according to the present embodiments may include a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable recording medium. Examples of the computer-readable recording medium include magnetic storage media (e.g., read-only memory (ROM), random-access memory (RAM), floppy disks, hard disks, etc.), and optical recording media (e.g., CD-ROMs, or Digital Versatile Discs (DVDs)). The computer readable recording medium can also be distributed over network coupled computer systems so that the computer readable code is stored and executed in a distributive manner. This media can be read by the computer, stored in the memory, and executed by the processor.

The present embodiments may be described in terms of functional block components and various processing steps. Such functional blocks may be realized by any number of hardware and/or software components configured to perform the specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative examples and are not intended to otherwise limit the scope of the present invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus.

The use of the terms "a" and "an" and "the" and similar referents in the context of describing the present invention (especially in the context of the following claims) are to be construed to cover both the singular and the plural. Furthermore, recitation of ranges of values herein are merely intended to serve as each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. The present invention is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

The invention claimed is:

1. A processor comprising:

at least one operator, each operator configured to perform a single operation; and at least one macro instruction processing unit communicatively coupled to the at least one operator and comprising a scheduler and a controller, wherein the at least one macro instruction processing unit is configured to:

receive a macro instruction to be processed by the processor, the macro instruction being an instruction that represents a plurality of operations to be performed by the processor, transmit, from the controller to the scheduler, information associated with performing the plurality of operations in a sequence indicated by the macro instruction, the information associated with the performing of the plurality of operations in the sequence including at least one instruction group, transmit, from the scheduler to the at least one operator, the at least one instruction group to perform the plurality of operations in the sequence indicated by the macro instruction, and receive, by the scheduler from the at least one operator, first data corresponding to a result of a first operation in response to the scheduler transmitting an instruction to perform the first operation, transmit, from the scheduler to the at least one operator, an instruction to perform a second operation based on the result of the first operation in response to the scheduler receiving the first data, receive, by the scheduler from the at least one operator, second data corresponding to a result of the second operation, and transmit, from the scheduler to the controller, the second data corresponding to the result of the second operation wherein the at least one macro instruction processing unit comprises a first macro instruction processing unit to execute a first type of operation and a second macro instruction processing unit to execute a second type of operation, wherein the at least one operator performs a first operation associated with a first macro instruction received by the first macro instruction processing unit and a second operation associated with a second macro instruction received by the second macro instruction processing unit, and wherein each of the at least one instruction group relates to a same operation.

2. The processor of claim 1, wherein the at least one macro instruction processing unit further comprises:

an address operation controller configured to control an address operator; and an operation controller configured to control an operator.

3. The processor of claim 1, further comprising:

at least one instruction processing unit configured to process a specific instruction, wherein the at least one macro instruction processing unit manages an execution of the macro instruction by using the at least one operator or the at least one instruction processing unit.

4. The processor of claim 1, further comprising:

an instruction distributor configured to distribute a single instruction or a macro instruction received from an instruction decoder to the at least one operator or the at least one macro instruction processing unit.

5. The processor of claim 4, wherein, when the instruction received from the instruction decoder is the single instruction, the instruction distributor is configured to allocate the single instruction to a first operator, and, wherein, when the instruction received from the instruction decoder is the macro instruction, the instruction distributor is configured to allocate the macro instruction to the at least one macro instruction processing unit.

6. The processor of claim 1, further comprising:

a loop controller configured to control a loop operation when an instruction received from a decoder comprises the loop operation.

7. A method of processing a macro instruction in a processor, the method comprising:

receiving a macro instruction to be processed by the processor, the macro instruction being an instruction that represents a plurality of operations to be performed by the processor;

allocating the macro instruction to at least one macro instruction processing unit;

instructing, by the at least one macro instruction processing unit, one or more operators based on at least one instruction group associated with the macro instruction to perform the plurality of operations in a sequence indicated by the macro instruction;

receiving, by a scheduler from at least one operator, first data corresponding to a result of a first operation in response to the scheduler transmitting an instruction to perform the first operation;

transmitting, from the scheduler to the at least one operator, an instruction to perform a second operation based on the result of the first operation in response to the scheduler receiving the first data;

receiving, by the scheduler from the at least one operator, second data corresponding to a result of the second operation; and transmitting, from the scheduler to a controller, the second data corresponding to the result of the second operation, and storing data that corresponds to a result of the plurality of operations being performed by the one or more operators in the sequence indicated by the macro instruction, wherein the at least one macro instruction processing unit comprises a first macro instruction processing unit to execute a first type of operation and a second macro instruction processing unit to execute a second type of operation, wherein the at least one operator performs a first operation associated with a first macro instruction received by the first macro instruction processing unit and a second operation associated with a second macro instruction received by the second macro instruction processing unit, and wherein each of the at least one instruction group relates to a same operation.

8. The method of claim 7, further comprising:

transmitting, by the at least one macro instruction processing unit, input data to the one or more operators;

performing, by the one or more operators, the plurality of operations on the input data; and outputting, by the one or more operators, results of each of the plurality of operations to the at least one macro instruction processing unit.

9. The method of claim 7, wherein the receiving of the macro instruction to be processed by the processor comprises:

receiving an instruction to be processed by the processor from an instruction decoder; and determining whether the instruction received from the instruction decoder is a general instruction or the macro instruction, and wherein the allocating of the macro instruction to the at least one macro instruction processing unit comprises, when it is determined that the instruction received from the instruction decoder is the macro instruction, allocating the macro instruction to the at least one macro instruction processing unit.

10. The method of claim 9, further comprising, when it is determined that the instruction to be processed by the processor received from the instruction decoder is a single instruction, allocating the single instruction to one of the operators.

11. A non-transitory computer-readable recording medium having recorded thereon a computer program, which, when executed by a computer, performs the method of claim 7.

12. A non-transitory computer-readable recording medium having recorded thereon a computer program, which, when executed by a computer, performs the method of claim 8.

13. A non-transitory computer-readable recording medium having recorded thereon a computer program, which, when executed by a computer, performs the method of claim 9.

14. A non-transitory computer-readable recording medium having recorded thereon a computer program, which, when executed by a computer, performs the method of claim 10.

* * * * *